United States Patent
Shike et al.

(10) Patent No.: US 7,071,647 B2
(45) Date of Patent: Jul. 4, 2006

(54) METHOD AND APPARATUS FOR DETECTING A HAZARD IN A MOVEABLE ELECTRONIC MEMBER

(75) Inventors: Seiji Shike, Iwaki (JP); Shoji Suzuki, Iwaki (JP); Naotoshi Endoh, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 3 days.

(21) Appl. No.: 10/973,650

(22) Filed: Oct. 26, 2004

(65) Prior Publication Data
US 2005/0134208 A1  Jun. 23, 2005

(30) Foreign Application Priority Data
Oct. 30, 2003 (JP) .............................. 2003-370515

(51) Int. Cl.
*H02P 3/00* (2006.01)
*G12B 9/00* (2006.01)

(52) U.S. Cl. ....................... 318/468; 318/265; 318/266; 318/466; 49/26; 49/28; 312/7.1; 312/9.41

(58) Field of Classification Search ..................... None
See application file for complete search history.

(56) References Cited

U.S. PATENT DOCUMENTS 6,648,579 B1 * 11/2003 Vartanian, Sr. ............ 414/546
6,747,364 B1   6/2004 Shibuya et al.
6,897,630 B1 *  5/2005 Murray et al. .............. 318/434
6,935,597 B1 *  8/2005 Shibuya ..................... 248/27.1
2005/0012488 A1 *  1/2005 Fitzgibbon et al. ......... 318/775

FOREIGN PATENT DOCUMENTS

JP    2000-155018    6/2000

* cited by examiner

*Primary Examiner*—Marlon T. Fletcher
*Assistant Examiner*—Eduardo Colon Santana
(74) *Attorney, Agent, or Firm*—Brinks Hofer Gilson & Lione

(57) ABSTRACT

A navigation apparatus has a movable face that is allowed to move bidirectionally between a retracted state and an extended state. A range of movement of the movable face is divided at a predetermined position, so that the movement of the movable face has an initial extending stage or initial retracting stage, and a stage subsequent to the initial extending stage or initial retracting stage. A controlling system for driving and controlling the movable face moves the movable face at a lower speed in the subsequent stage than in the initial extending stage or initial retracting stage. Furthermore, a hazard detecting time for the subsequent stage is chosen to be shorter than a hazard detecting time for the initial extending stage or initial retracting stage. Accordingly, the movable face is moved quickly and smoothly in the initial stage while improving safety in the subsequent stage.

18 Claims, 13 Drawing Sheets

METHOD AND APPARATUS FOR DETECTING A HAZARD IN A MOVEABLE ELECTRONIC MEMBER

BACKGROUND OF THE INVENTION

1. Field of the Invention

The present invention relates to electronic apparatuses and methods for detecting a hazard for movement. More specifically, the present invention relates to an electronic apparatus having, for example, a movable face for opening and closing a slot for loading a recording medium or the like.

2. Description of the Related Art

In conventional on-vehicle audio/visual devices (e.g., navigation apparatuses) of a known type, behind a rotatable operation panel (hereinafter referred to as a movable face) having keys and a display, a medium loading slot for loading an information recording medium is provided so that a wide space for display is provided. Regarding the on-vehicle devices of the type described above, when an information recording medium is provided to the on-vehicle device, the movable face is rotated to expose the medium loading slot, and a medium such as a compact disk (CD), a digital video disk (DVD), a mini disk (MD), or a cassette tape is provided to the on-vehicle device through the medium loading slot, the movable face is then moved back to the original position, and then information is played back from or is recorded on the information recording medium.

FIGS. 13A to 13C show schematic constructions of movable faces according to the related art. Referring to FIG. 13A, a movable face 901 is allowed to slide and rotate in the direction of an arrow from a front surface of an apparatus 900 so that a medium loading slot 902 is exposed or hidden as appropriate. Referring to FIG. 13B, a movable face 911 is closed or opened in the direction of an arrow about a rotation axis (not shown) on a front surface of an apparatus 910 so that a medium loading slot 912 is exposed or hidden as appropriate. Referring to FIG. 13C, a movable face 921 is horizontally moved from a front surface of an apparatus 920 and then rotated so that a medium loading slot 922 is exposed or hidden as appropriate.

When an unexpected object gets into and is pinched by a mechanism for moving the movable face, even when a motor is driven, the movable face is not moved in a desired direction. This could lead to a serious problem, such as damage to the motor or damage to other parts of the mechanism. Thus, in a conventional device having a movable face, a switch for detecting an open state of the movable face and a switch for detecting a closed state of the movable face are provided, and it is determined that an unexpected object is pinched or abutted when a switch is not turned on within a predetermined time, and the movable face is protected, i.e., the movable face is stopped or the direction of movement of the movable face is reversed. Also, a method that does not employ detection switches has been proposed. According to the method, the current of a driving motor for moving the movable face is detected, and when a current exceeding a predetermined amount is detected, it is determined that an unexpected object is pinched or abutted and the face is protected.

According to the conventional method, however, time is set with detection switches provided at a start point and an end point of movement of the movable face, so that the movable face is not protected until the predetermined time elapses, sometimes resulting in a serious problem. According to the conventional method that detects an excess current, it is difficult to accurately determine whether the load is actually caused by the movable face or the load is caused by pinching of an unexpected object. Thus, in some cases, the movable face is erroneously protected, or a serious problem occurs without protecting the movable face.

As techniques for overcoming these problems, for example, a method of detecting a hazard for movement, disclosed in Japanese Unexamined Patent Application Publication No. 2000-155018, is known. According to this method, the position of a movable member after elapse of a predetermined time from a current time is predicted, and whether a hazard for movement has occurred is determined based on whether the movable member has passed the predicted position when the predetermined time has elapsed.

According to the method disclosed in Japanese Unexamined Patent Application Publication No. 2000-155018, however, the speed of movement of the movable member is constant from a retracted state to an extended state, and a period for determining whether a hazard for movement has occurred is also constant. Thus, quick operation is not allowed even when the probability of occurrence of a hazard is extremely low, for example, in an initial stage of moving from the retracted state to the extended state or an initial state of moving from the extended state to the retracted state.

SUMMARY OF THE INVENTION

Accordingly, it is an object of the present invention to provide an electronic apparatus and a method of detecting a hazard for movement with which a movable member is moved smoothly while assuring high safety.

In order to achieve the object, the present invention, in one aspect thereof, provides an electronic apparatus including a movable member that is allowed to move in a plurality of sections; a driving unit for moving the movable member; and a controller for controlling the driving unit and for detecting a hazard that occurs during movement of the movable member at respectively different sensitivities in the plurality of sections. The probability of occurrence of a hazard and the possibility of the hazard leading to a severe problem differ depending on sections where the movable member is moved. Thus, respectively different sensitivities are used for the sections. Accordingly, for example, the hazard is detected at a high sensitivity in a section where the probability of occurrence of the hazard and the probability of the hazard leading to a severe problem are relatively high, assuring high safety. Furthermore, the hazard is detected at a low sensitivity in a section where the probability of occurrence of the hazard and the probability of the hazard leading to a severe problem are relatively low, so that detection of a harmless hazard is avoided, allowing smooth movement of the movable member.

The sensitivities may correspond to periods for detecting an amount of movement of the movable member so that the controller detects occurrence of the hazard based on whether an amount of movement of the movable member in one period has reached a target amount of movement.

When the sensitivities correspond to periods for detecting an amount of movement of the movable member, preferably, a period for a section having a relatively high probability of occurrence of the hazard is chosen to be shorter than a period for a section having a relatively low probability of occurrence of the hazard. With the shorter period, the presence or absence of occurrence of the hazard is detected frequently, so that the sensitivity in the section is improved. Since the sensitivity in the section where the probability of occurrence of the hazard is relatively high is higher than the sensitivity in the section where the probability of occurrence of the hazard is relatively low, safety during movement of the movable member is improved.

Alternatively, the sensitivities may correspond to periods for detecting a position of the movable member so that the controller detects occurrence of the hazard based on whether the movable member has reached a target position in one period.

When the sensitivities correspond to periods for detecting a position of the movable member, preferably, a period for a section having a relatively high probability of occurrence of the hazard is chosen to be shorter than a period for a section having a relatively low probability of occurrence of the hazard. Since the sensitivity for detecting the hazard is improved with the shorter period as described above, safety during movement of the movable member is improved.

The controller may move the movable member at speeds based on the plurality of sections. As described earlier, the probability of occurrence of a hazard and the possibility of the hazard leading to a severe problem differ depending on sections where the movable member is moved. Thus, respectively different sensitivities are used for the sections. Accordingly, for example, the movable member is moved slowly in a section where the probability of occurrence of the hazard and the probability of the hazard leading to a severe problem are relatively high, assuring high safety. Furthermore, the movable member is moved quickly in a section where the probability of occurrence of the hazard and the probability of the hazard leading to a severe problem are relatively low, allowing quick movement of the movable member. Furthermore, by moving the movable member at different speeds in the respective sections, the beauty of operation is improved, serving to improve impression to a user.

When the sensitivities correspond to periods for detecting an amount of movement of the movable member, preferably, a period for a first section having a relatively high probability of occurrence of the hazard is shorter than a period for a second section having a relatively low probability of occurrence of the hazard, and the controller moves the movable member at a lower speed in the first section than in the second section. As described above, since the sensitivity for detecting occurrence of the hazard is improved with the shorter period, safety during movement of the movable member is improved. Furthermore, since the movable member is moved at the lower speed in the section where the probability of occurrence of the hazard is relatively high, high safety is assured. Furthermore, the movable member is moved quickly in the section where the probability of occurrence of the hazard is relatively low, allowing quick movement. Furthermore, by moving the movable member at different speeds in the respective sections, the beauty of operation is improved, serving to improve impression to a user.

When the sensitivities correspond to periods for detecting a position of the movable member, preferably, a period for a first section having a relatively high probability of occurrence of the hazard is shorter than a period for a second section having a relatively low probability of occurrence of the hazard, and the controller moves the movable member at a lower speed in the first section than in the second section. Also in this arrangement, safety during movement of the movable member is improved, and quick movement is allowed. Furthermore, by moving the movable member at different speeds in the respective sections, the impression to a user is improved.

When the controller moves the movable member reciprocally in a first direction and a second direction, preferably, the plurality of sections is set individually for each of the first direction and the second direction. As such, the present invention can also be applied to an electronic apparatus having a movable member that moves reciprocally. When the movable member moves reciprocally in a first direction and a second direction, the probability distribution of occurrence of the hazard differs between the first direction and the second direction. Thus, a plurality of sections is set individually for each of the first direction and the second direction, and different sensitivities are used in the respective sections. Accordingly, occurrence of the hazard can be accurately detected both for the first direction and the second direction.

When the controller moves the movable member reciprocally in a first direction and a second direction, preferably, the plurality of sections include a section where a sensitivity for the first direction differs from a sensitivity for the second direction. When the movable member moves reciprocally in a first direction and a second direction, the probability distribution of occurrence of the hazard differs between the first direction and the second direction. Thus, in some cases, different sensitivities are set for the first direction and the second direction with regard to the same point.

Preferably, the controller sets a higher sensitivity for a section that is immediately before an end point of movement than a sensitivity for a section that is immediately after a start point of movement. The probability of occurrence of a hazard and the possibility of the hazard leading to a severe problem are higher in a section immediately before an end point of movement of the movable member than in a section immediately after a start point of movement of the movable member. Thus, a relatively high sensitivity is set for the section immediately before the end point of movement, so that safety in the section is improved.

Preferably, the controller reverses a direction of movement of the movable member when occurrence of the hazard is detected. Since the direction of movement of the movable member is reversed when a hazard is detected, it is possible to eliminate the hazard or to prevent the hazard from leading to a severe problem.

The movable member may include a face for moving a display panel to an open or closed position. For example, since a demand exists for miniaturization of navigation apparatuses, video recorders, CD players, DVD players, and the like, sometimes a display panel is provided such that the display panel can be opened and closed. The present invention can be applied to an electronic apparatus having such an arrangement.

The present invention, in another aspect thereof, provides a method of detecting a hazard for movement, the method including a first step of moving a movable member in a plurality of sections; and a second step of detecting a hazard that occurs during movement of the movable member; wherein the second step detects occurrence of the hazard at respectively different sensitivities in the plurality of sections. As described earlier, the probability of occurrence of a hazard and the possibility of the hazard leading to a severe problem differ depending on sections where the movable member is moved. Thus, the hazard is detected at different sensitivities in the respective sections. Accordingly, for example, the hazard is detected at a high sensitivity in a section where the probability of occurrence of the hazard and the probability of the hazard leading to a severe problem are relatively high, assuring high safety. Furthermore, the hazard is detected at a low sensitivity in a section where the probability of occurrence of the hazard and the probability of the hazard leading to a severe problem are relatively low, so that detection of a harmless hazard is avoided, allowing smooth movement of the movable member.

The sensitivities may correspond to periods for detecting an amount of movement of the movable member so that the second step detects occurrence of the hazard based on whether an amount of movement of the movable member in one period has reached a target amount of movement.

The sensitivities may correspond to periods for detecting a position of the movable member so that the second step detects occurrence of the hazard based on whether the movable member has reached a target position in one period.

The first step may move the movable member at speeds based on the plurality of sections. As described earlier, the probability of occurrence of a hazard and the possibility of the hazard leading to a severe problem differ depending on sections where the movable member is moved. Accordingly, for example, the movable member is moved slowly in a section where the probability of occurrence of the hazard and the probability of the hazard leading to a severe problem are relatively high, assuring high safety in the section. Furthermore, the movable member is moved quickly in a section where the probability of occurrence of the hazard and the probability of the hazard leading to a severe problem are relatively low, allowing quick movement of the movable member in the section. Furthermore, by moving the movable member at different speeds in the respective sections, the beauty of operation is improved, serving to improve the impression to a user.

The method may further include a third step of reversing a direction of movement of the movable member when occurrence of the hazard is detected in the second step. Since the direction of movement of the movable member is reversed when a hazard is detected, it is possible to eliminate the hazard or to prevent the hazard from leading to a severe problem.

According to the present invention, an electronic apparatus and a method of detecting a hazard for movement with which a movable member is moved smoothly while assuring high safety are provided.

DESCRIPTION OF THE PREFERRED EMBODIMENTS

Now, embodiments of the present invention will be described in detail with reference to the drawings.

First Embodiment

Figure 1:
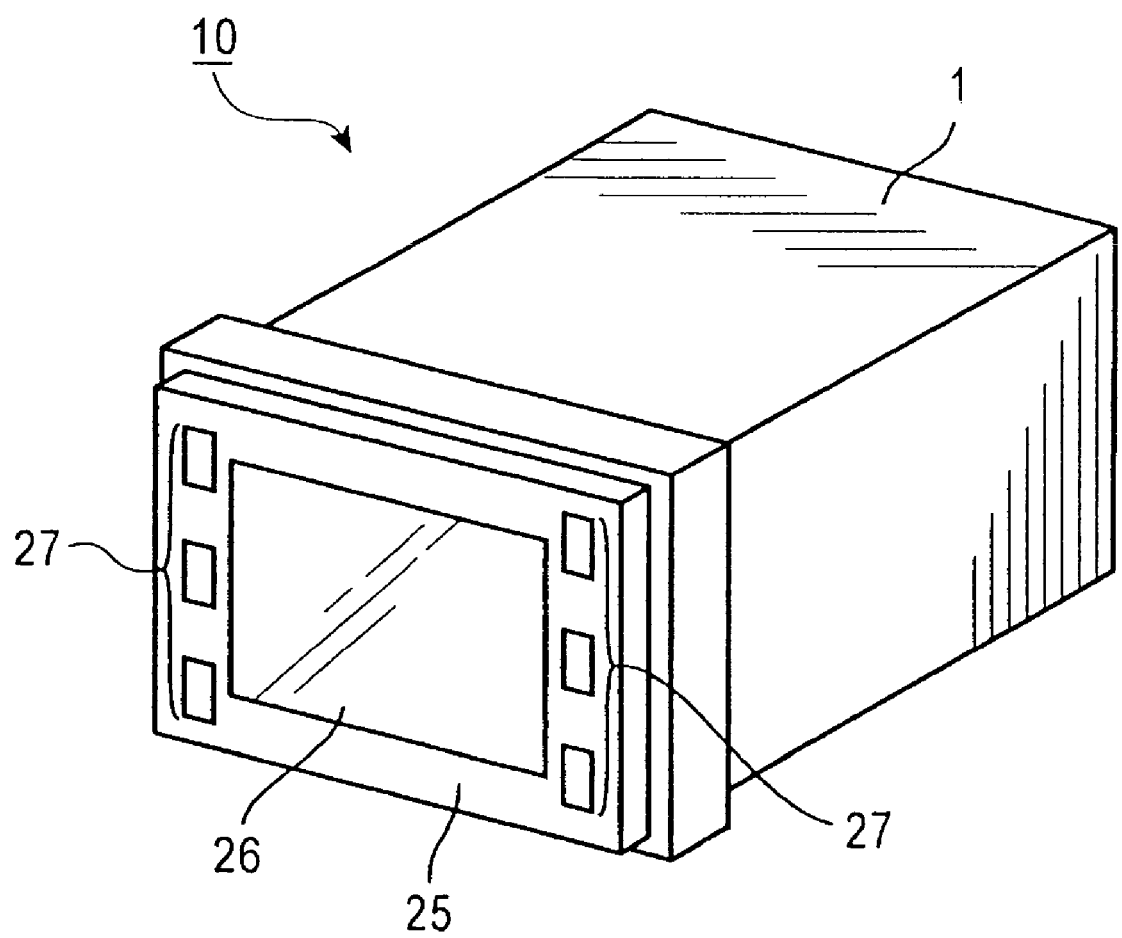
FIG. 1 is a perspective view of a navigation apparatus according to a first embodiment of the present invention, with a movable face in a retracted state.
Figure 2:
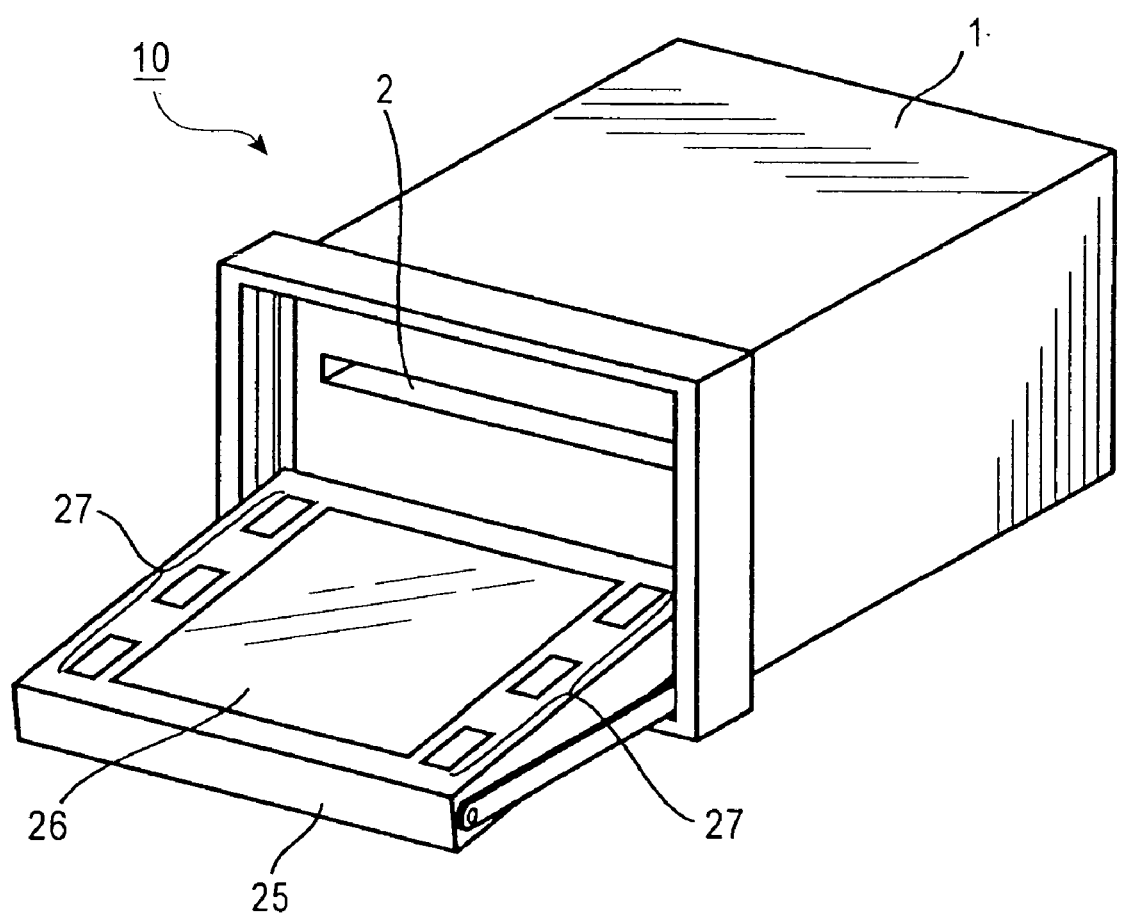
FIG. 2 is a perspective view of the navigation apparatus according to the first embodiment, with the movable face in an extended state.

Now, a first embodiment of the present invention will be described with reference to the drawings. FIG. 1 is a perspective view showing the construction of a navigation apparatus 10 according to the first embodiment, showing a state where a movable face 25 is retracted to a predetermined position (hereinafter referred to as a retracted state). FIG. 2 is a perspective view showing the construction of the navigation apparatus 10 in a state where the movable face 25 is fully extended (hereinafter referred to as an extended state).

As shown in FIGS. 1 and 2, in the navigation apparatus 10, the movable face 25 is attached to a front surface of a main unit 1. On a front surface of the movable face 25, a monitor 26 and an operating unit 27 are provided.

The monitor 26 is implemented, for example, by a liquid crystal display. The operating unit 27 is implemented, for example, by button switches. If the monitor 26 is implemented by a touch-panel liquid crystal display, button switches of the operating unit 27 may be displayed on the monitor 26.

Figure 3:
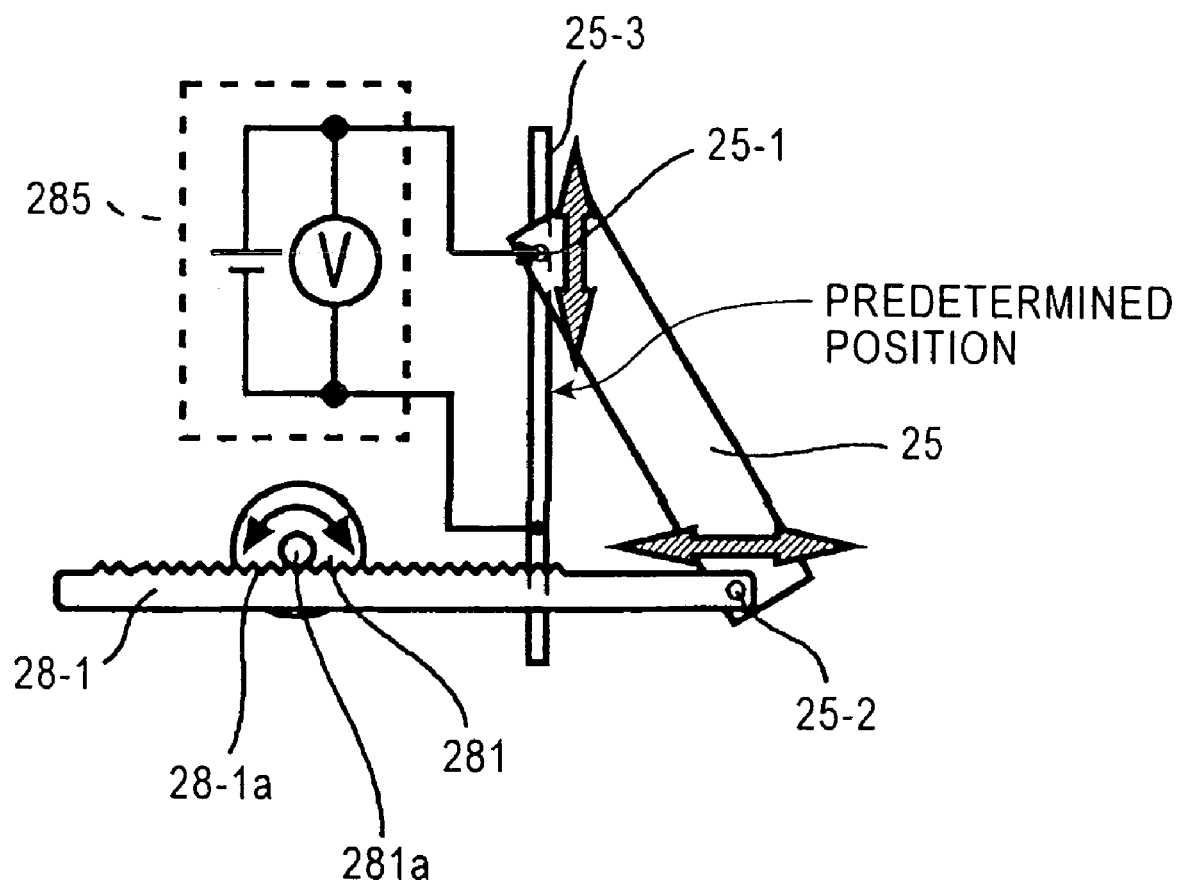
FIG. 3 is a diagram showing an example mechanism for driving and controlling the movable face in the navigation apparatus according to the first embodiment.

The movable face 25 is movably linked to an arm 28-1 of a movable-face controlling mechanism 28 that will be described later. The arm 28-1 extends or retracts the movable face 25 using a motor as a power source. FIG. 3 shows an example mechanism for driving and controlling the movable face 25.

As shown in FIG. 3, securing pins 25-2 are provided at the proximities of lower ends of side surfaces of the movable face 25. The securing pins 25-2 are secured to arms 28-1 that are allowed to slide horizontally. The arms 28-1 have tooth sections 28-1a. The tooth sections 28-1 are engaged with gears 281a of motors 281. Thus, the arms 28-1 are allowed to slide horizontally by the motors 281. Furthermore, securing pins 25-1 are provided at the proximities of upper ends of the side surfaces of the movable face 25. The securing pins 25-1 are secured to rails 25-3 provided in a space of the main unit 1 for retracting the movable face 25. That is, the securing pins 25-1 are allowed to slide on the rails 25-3 in upward and downward directions. Thus, by causing the arms 28-1 to slide in the horizontal direction, the movable face 25 is moved in an extending direction or a retracting direction. The extending direction refers to a direction of movement for moving the movable face 25 to the extended state, corresponding to a direction in which the movable face 25 is moved when the arms 28-1 are moved rightward as viewed in FIG. 3. The retracting direction refers to a direction opposite to the extending direction.

The rails 25-3 also function as resistors whose resistances change according to the position of the movable face 25. More specifically, each of the securing pins 25-1 functions as a control terminal of a variable resistor, and a voltage is applied between the securing pin 25-1 and one end of the associated rail 25-3. Thus, it is possible to obtain a voltage based on the position of the securing pin 25-1 on the rail 25-3. The voltage is detected by a position detecting linear position sensor (LPS) 285.

A "predetermined position" shown in FIG. 3 is a position for dividing a range of movement of the movable face 25 into a plurality of sections (two sections in this embodiment) with consideration of the probability of occurrence of a hazard. Now, the probability of occurrence of a hazard will be described with reference to FIGS. 4A to 4C and FIGS. 5A to 5C.

Figure 4A:
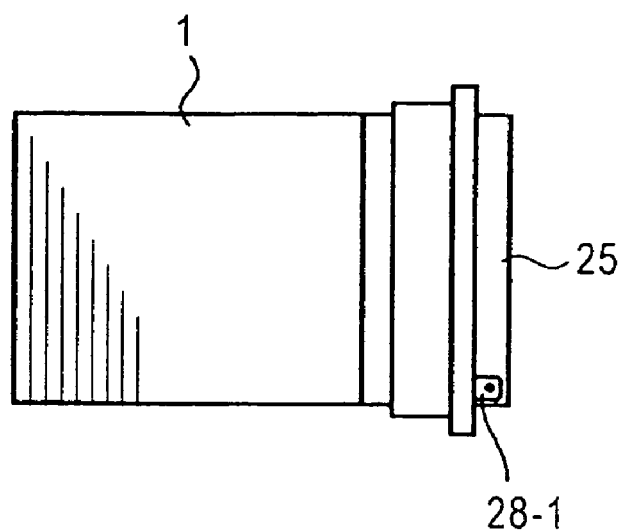
FIG. 4A is a side view of the navigation apparatus with the movable face in the retracted state.
Figure 4B:
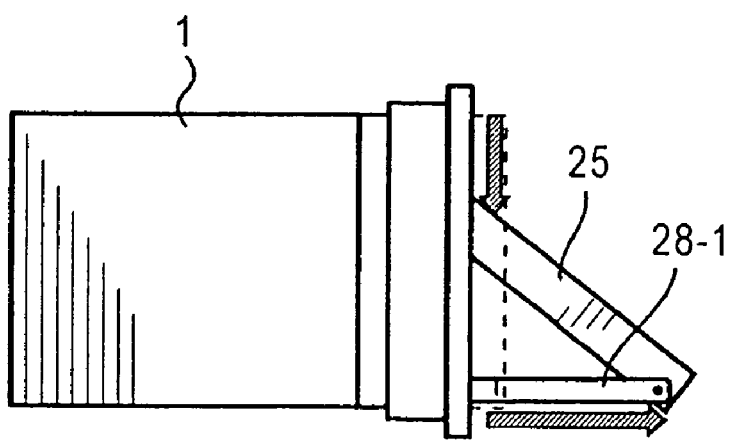
FIG. 4B is a side view of the navigation apparatus with the movable face moved from the retracted state to a predetermined position.
Figure 4C:
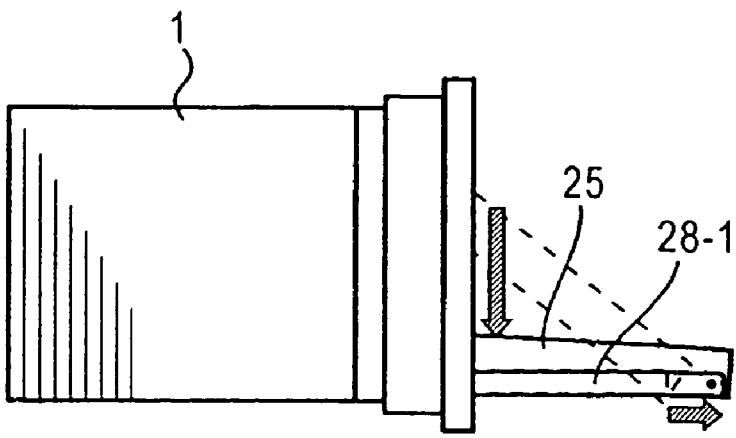
FIG. 4C is a side view of the navigation apparatus with the movable face moved from the predetermined position to the extended state.
Figure 5A:
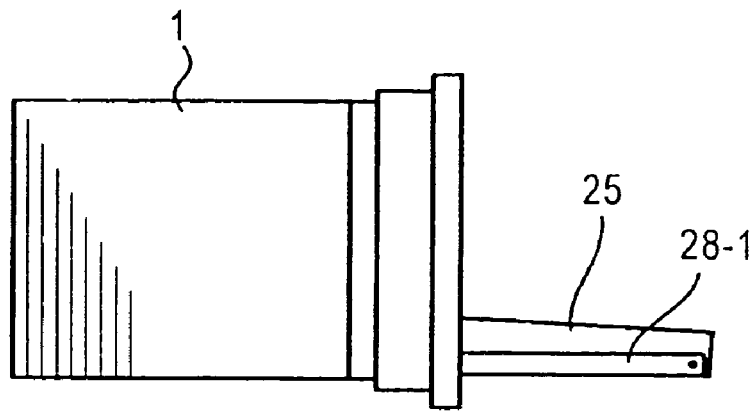
FIG. 5A is a side view of the navigation apparatus with the movable face in the extended state.
Figure 5B:
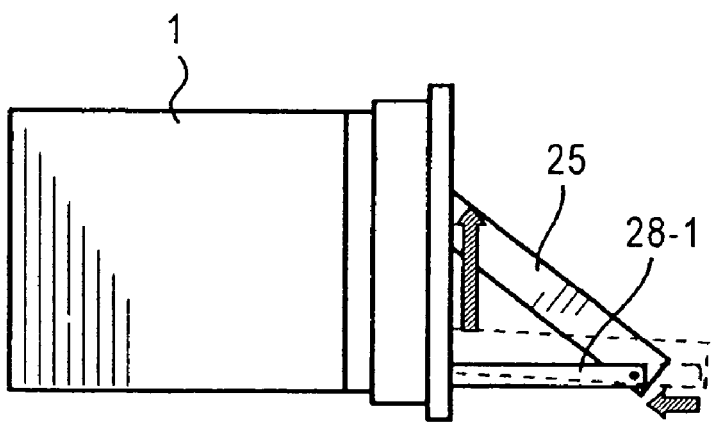
FIG. 5B is a side view of the navigation apparatus with the movable face moved from the extended state to the predetermined position.
Figure 5C:
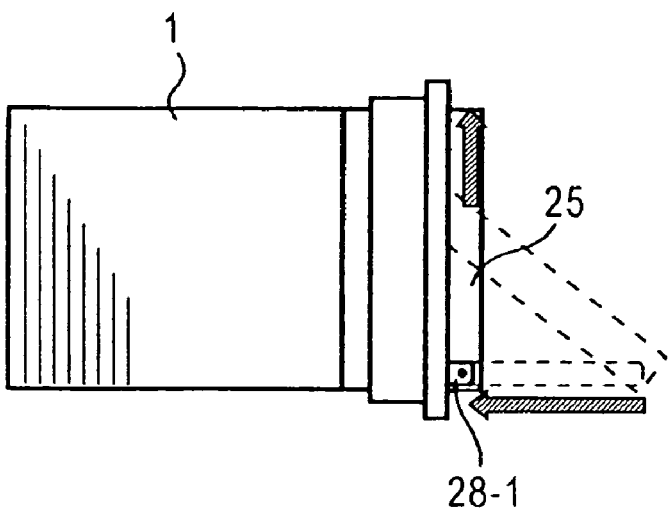
FIG. 5C is a side view of the navigation apparatus with the movable face moved from the predetermined position to the retracted state.

FIG. 4A is a side view of the navigation apparatus 10 with the movable face 25 in the retracted state. FIG. 4B is a side view of the navigation apparatus 10 with the movable face moved from the retracted state shown in FIG. 4A to the predetermined position shown in FIG. 3 (hereinafter referred to as an intermediate state). FIG. 4C is a side view of the navigation apparatus 10 with the movable face 25 moved from the intermediate state shown in FIG. 4B to the extended state. FIG. 5A is a side view of the navigation apparatus 10 with the movable face 25 in the extended state. FIG. 5B is a side view of the navigation apparatus 10 with the movable face 25 moved from the extended state shown in FIG. 5A to the predetermined position. FIG. 5C is a side view of the navigation apparatus 10 with the movable face 25 moved from the intermediate state shown in FIG. 5B to the retracted state.

For example, when the movable face 25 is moved in the extending direction from the retracted state (refer to FIGS. 4A and 4B, hereinafter referred to as an initial extending stage), the probability of occurrence of a hazard, such as pinching an object (e.g., a finger), is relatively low, and the possibility of the hazard leading to a severe problem is also relatively low. Similarly, when the movable face 25 is moved in the retracting direction from the extended state (refer to FIGS. 5A and 5B, hereinafter referred to as an initial retracting stage), the probability of occurrence of a hazard, such as pinching an object, (e.g., a finger), is relatively low, and the possibility of the hazard leading to a severe problem is also relatively low. That is, in a section immediately after the start of a movement of the movable face 25, the probability of occurrence of a hazard and the possibility of the hazard leading to a severe problem are relatively low. On the other hand, after the initial extending stage (refer to FIGS. 4B and 4C), the probability of occurrence of the hazard is relatively high, and the possibility of the hazard leading to a severe problem is also relatively high. Similarly, after the initial retracting state (refer to FIGS. 5B and 5C), the probability of occurrence of the hazard is relatively high, and the possibility of the hazard leading to a severe problem is also relatively high. That is, in a section immediately before the end of a movement of the movable face 25, the probability of occurrence of a hazard and the possibility of the hazard leading to a severe problem are relatively high.

Accordingly, in this embodiment, as shown in FIG. 3, the regions on the rails 25-3 are divided into two sections at the predetermined position, and control is exercised based on which section the movable face 25 is currently located in. More specifically, the movable face 25 is moved relatively quickly in the initial extending or retracting stage, which is referred to as a high-speed operation. Furthermore, a hazard detecting time for the high-speed operation is chosen to be relatively long. Thus, quick operation in the initial stage is achieved. On the other hand, in a subsequent stage after the initial extending or retracting stage, the movable face 25 is moved relatively slowly, which is referred to as a low-speed operation. Furthermore, a hazard detecting time for the low-speed operation is chosen to be relatively short. Thus, after the initial stage, particularly in a section immediately before the end of a movement, detection sensitivity is set to be high, so that the safety during the movement is assured.

The predetermined position is, for example, a middle position of the region where the movable face 25 is moved. However, without limitation thereto, the predetermined position may be closer to the position in the retracted state or closer to the position in the extended state. Furthermore, the predetermined position may be individually set for each direction of movement of the movable face 25. For example, the predetermined position may be a position at a predetermined distance as viewed from an initial position or end position of the movable face 25.

The hazard detecting time is a period for detecting occurrence of a hazard, for example, a period for detecting a current position or the amount of movement of the movable face 25. Thus, by shortening the hazard detecting time, it is possible to frequently check the presence or absence of occurrence of a hazard, so that the sensitivity for detecting occurrence of a hazard is improved. Thus, the hazard detecting time functions as a parameter that determines the sensitivity of detection of a hazard.

Additionally, the beauty of operation is improved by changing the speed of movement in a stepwise manner, serving to improve the impression to a user.

Figure 6:
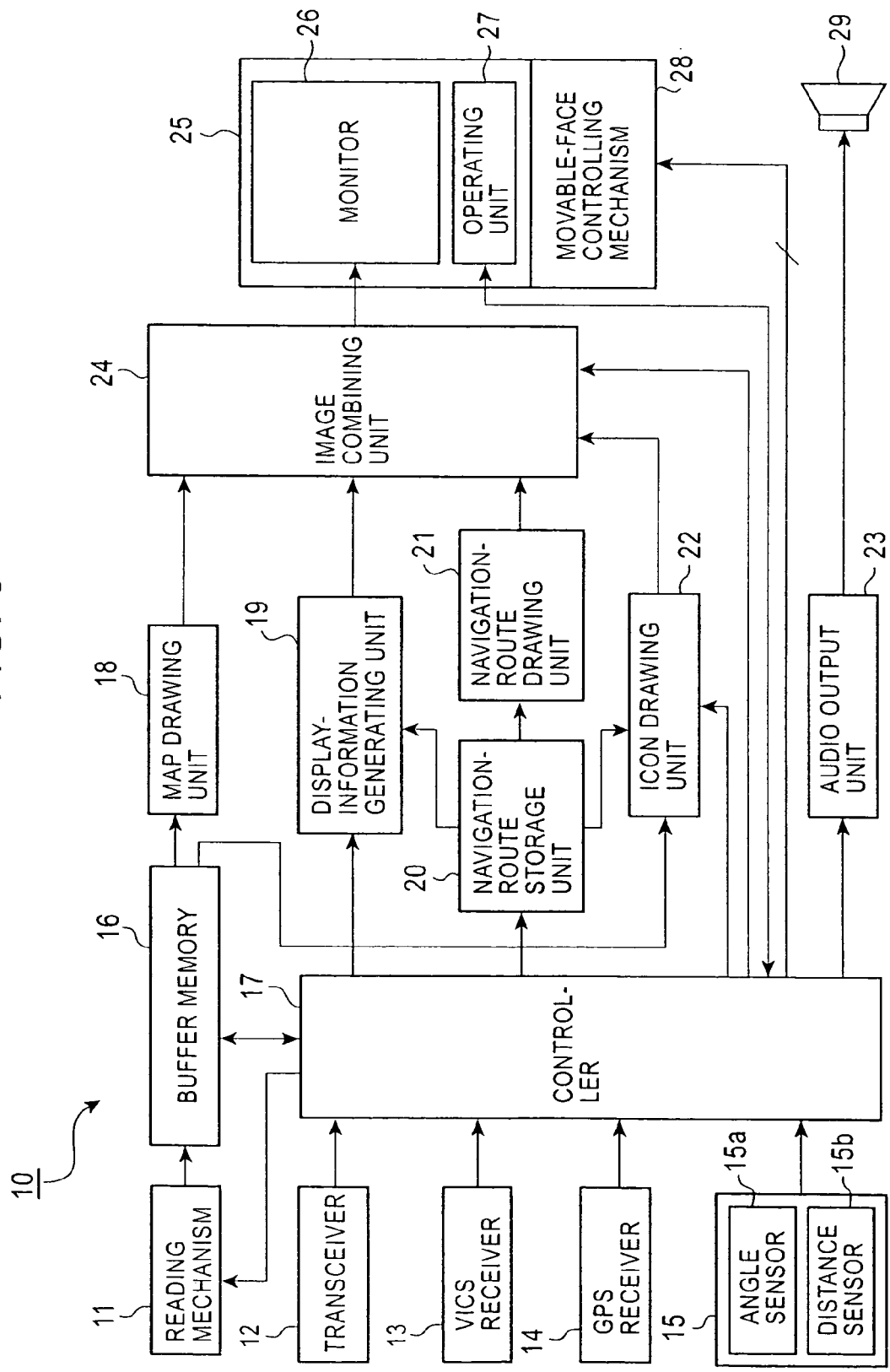
FIG. 6 is a block diagram showing the overall internal construction of the navigation apparatus according to the first embodiment.

Next, the internal construction of the navigation apparatus 10 will be described in detail with reference to the drawings. FIG. 6 is a block diagram showing the overall internal construction of the navigation apparatus 10.

Referring to FIG. 6, a reading mechanism 11 allows map data, guidance data, multimedia data, or the like to be read from a recording medium such as a compact disk (CD) read-only memory (ROM) or a digital video disk (DVD) ROM. The map data stored on the recording medium is divided by suitable longitudinal width and latitudinal width in accordance with reduction scales (e.g., 1/12,500, 1/25,000, 1/50,000, 1/100,000, and the like). Furthermore, roads (road data), various landmarks (also referred to as items), and the like, included in the map data, are represented by sets of coordinates of nodes represented by latitude and longitude.

A transceiver 12 is implemented, for example, by an on-vehicle phone for communicating with various service centers or the like. A VICS (Vehicle Information and Communication System) receiver 13 allows reception of VICS information transmitted from radio wave beacons or optical beacons. A GPS (Global Positioning System) receiver 14 allows detection of the latitude and longitude of a current position of the vehicle by receiving GPS signals transmitted from GPS satellites. A self-contained navigation sensor 15 includes an angle sensor 15*a* including a gyro or the like for detecting an orientation of the vehicle, and a distance sensor 15*b* that generates a pulse each time a predetermined distance is traveled, allowing detection of a direction and a speed of travel of the vehicle.

A monitor 26 allows various information received from the navigation apparatus 10, such as a map, a navigation route, a current position of the vehicle, or landmarks, to be displayed on a screen. A speaker 29 allows output of audio guidance information received from the navigation apparatus 10. The speaker 29 also allows playback of music or the like from other acoustic devices or the like.

A buffer memory 16 is capable of temporarily storing map data or the like received from the reading mechanism 11, under the control of a controller 17 that will be described below.

A controller 17 is implemented by a processing device such as a microcomputer or a central processing unit (CPU). The controller 17 stores a navigation program, and executes various processing for navigation according to the navigation program. The various processing includes detecting a current position of the vehicle based on signals supplied from the self-contained navigation sensor 15, reading map data to be displayed from the reading mechanism 11 into the buffer memory 16, and searching for a navigation route from a starting point to a destination point based on specified search conditions using map data or the like read from the buffer memory 16. The navigation program may be stored on a CD-ROM, a DVD-ROM, or the like. In that case, the controller 17 reads the navigation program therefrom and executes the navigation program when needed.

A map drawing unit 18 is capable of drawing a map image using map data read into the buffer memory 16. A display-information generating unit 19 generates various menu screens (operation screens) and various marks such as a vehicle position mark and a cursor in accordance with operation status. A navigation-route storage unit 20 stores data regarding all the nodes of a navigation route found by the controller 17 and data of a navigation route modified during searching. A navigation-route drawing unit 21 reads data stored in the navigation-route storage unit 20, and draws a navigation route in a mode that is different from a mode of other roads (e.g., highlighting by color, line width, or the like). An icon drawing unit 22 draws icons respectively representing landmarks corresponding to landmark data (also referred to as item data) included in the map data. An audio output unit 23 is implemented using, for example, a digital signal processor (DSP), and it supplies audio signals to the speaker 29 based on signals from the controller 17.

An image combining unit 24 displays a navigation route drawn by the navigation-route drawing unit 21, an operation screen and various marks drawn by the display-information generating unit 19, and icons drawn by the icon drawing unit 22, as overlapped on a map image drawn by the map drawing unit 18, on the monitor 26.

Figure 7:
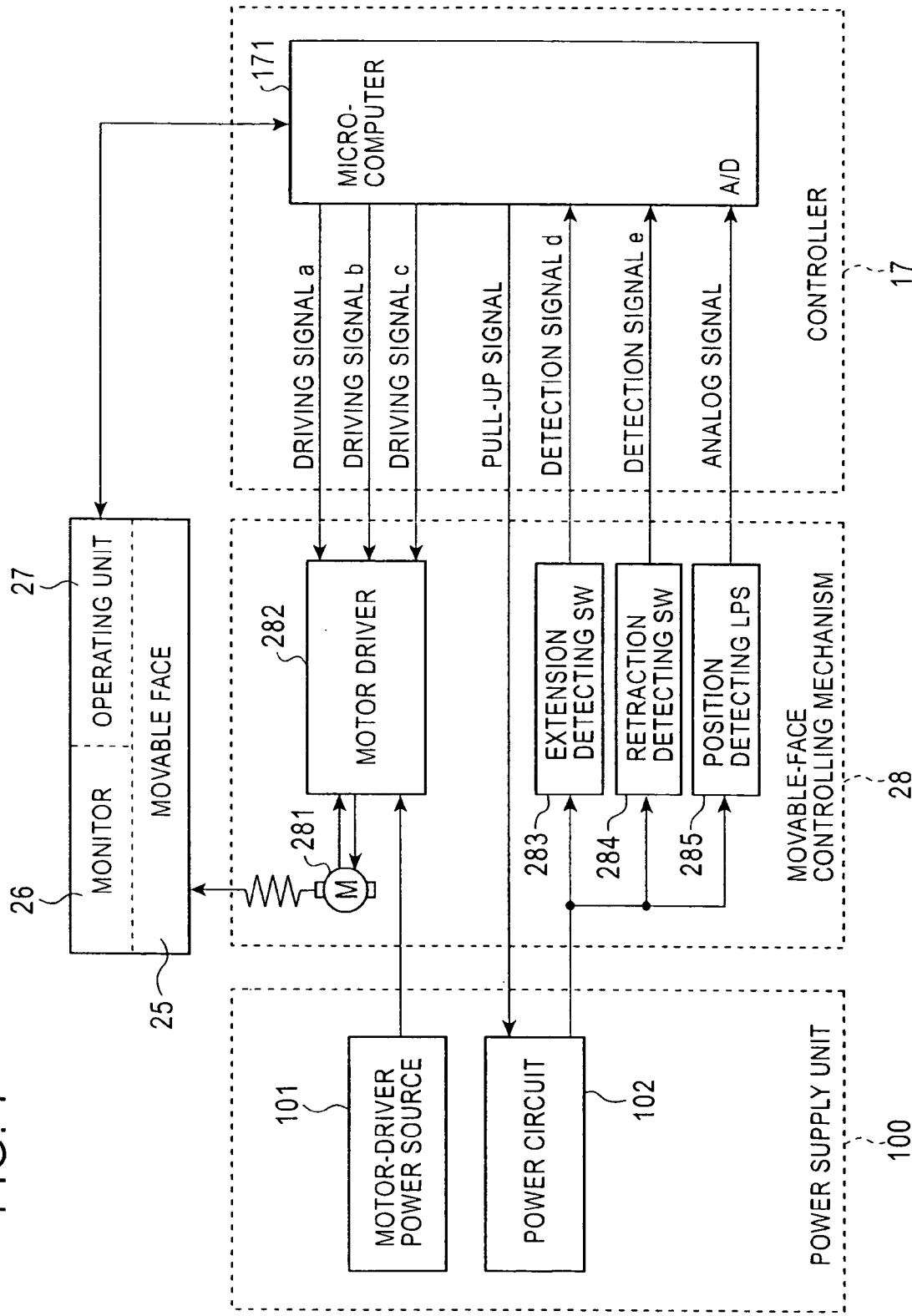
FIG. 7 is a block diagram showing the construction of a control system formed by a controller, a movable-face controlling mechanism, and the movable face in the navigation apparatus according to the first embodiment.

In the construction described above, the movable-face controlling mechanism 28 functions as a driving unit for moving the movable face 25. It is to be noted that the controller 17 may be included in the driving unit. That is, the controller 17 and the movable-face controlling mechanism 28 function together to form a controlling system for driving and controlling the movable face 25. FIG. 7 shows a specific construction of the controlling system.

As shown in FIG. 7, the controlling system of the movable face 25 includes a power supply unit 100 in addition to the movable-face controlling mechanism 28 and the controller 17.

The power supply unit 100 includes a motor-driver power source 101 and a power circuit 102 for various detecting switches and sensors, and it supplies a voltage to the movable-face controlling mechanism 28 and other parts.

The movable-face controlling mechanism 28 includes a motor 281, a motor driver 282, an extension detecting switch (SW) 283, a retraction detecting switch 284, and a position detecting LPS 285. The motor driver 282 generates a driving voltage based on a signal received from the controller 17, and applies the voltage to the motor 281. The motor 281 moves the movable face 25 based on the driving voltage applied thereto. The extension detecting switch 283 detects the movable face 25 in the extended state, and supplies a detection signal d to the controller 17. The retraction detecting switch 284 detects the movable face 25 in the retraction state, and supplies a detection signal e to the controller 17. The position detecting LPS 285 outputs an analog voltage corresponding to a current position of the movable face 25.

The controller 17 includes a microcomputer 171, and it controls the movable-face controlling mechanism 28 based on a signal supplied thereto. The microcomputer 171 also receives signals from the operating unit 27 and processes the signals.

Now, operation of the control system will be described with reference to the construction shown in FIG. 7 and flowcharts shown in FIGS. 8 and 9. The description will be directed mainly to the operation of the microcomputer 171.

Figure 8:
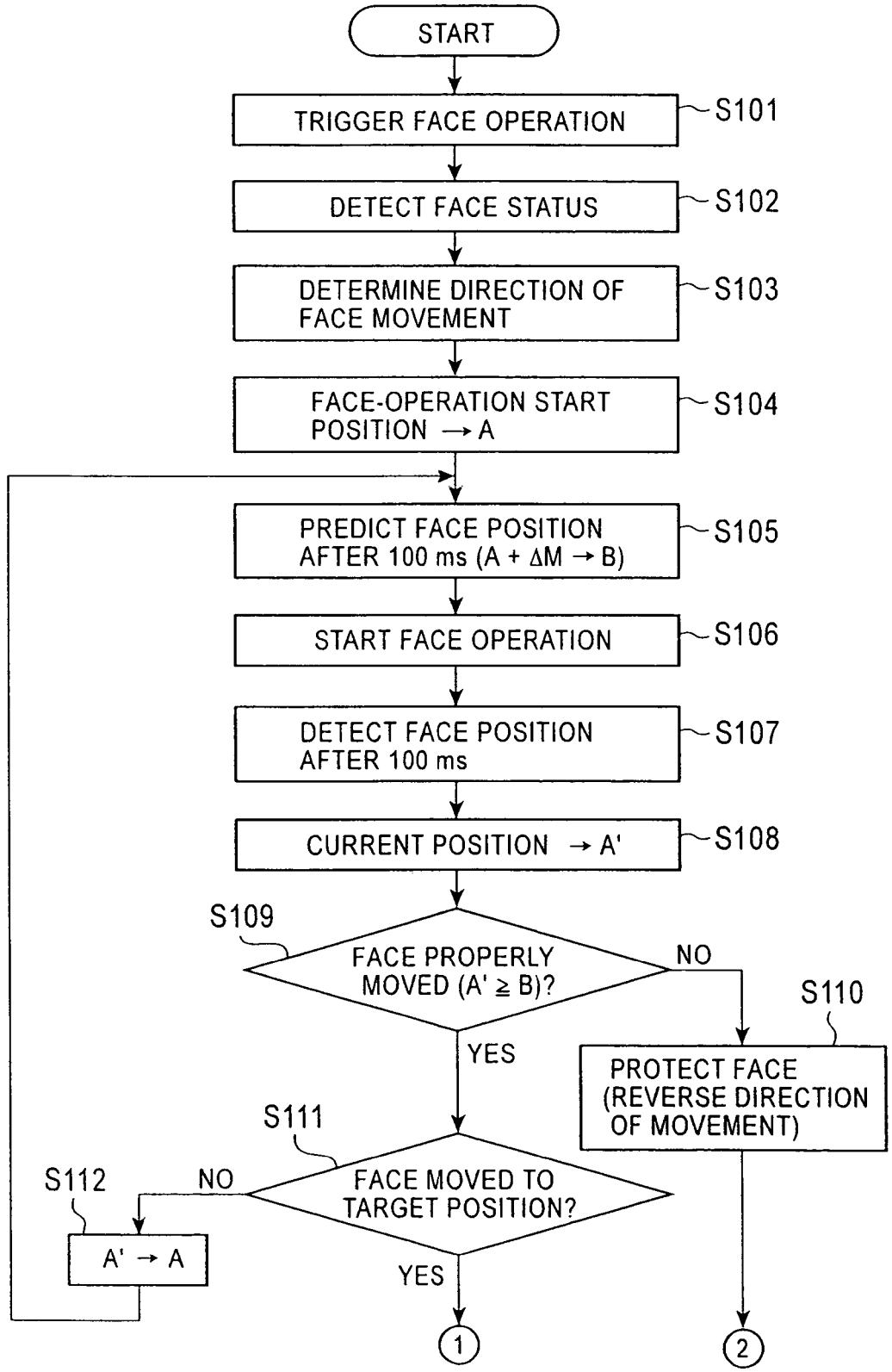
FIG. 8 is a flowchart showing an operation of a microcomputer according to the first embodiment.
Figure 9:
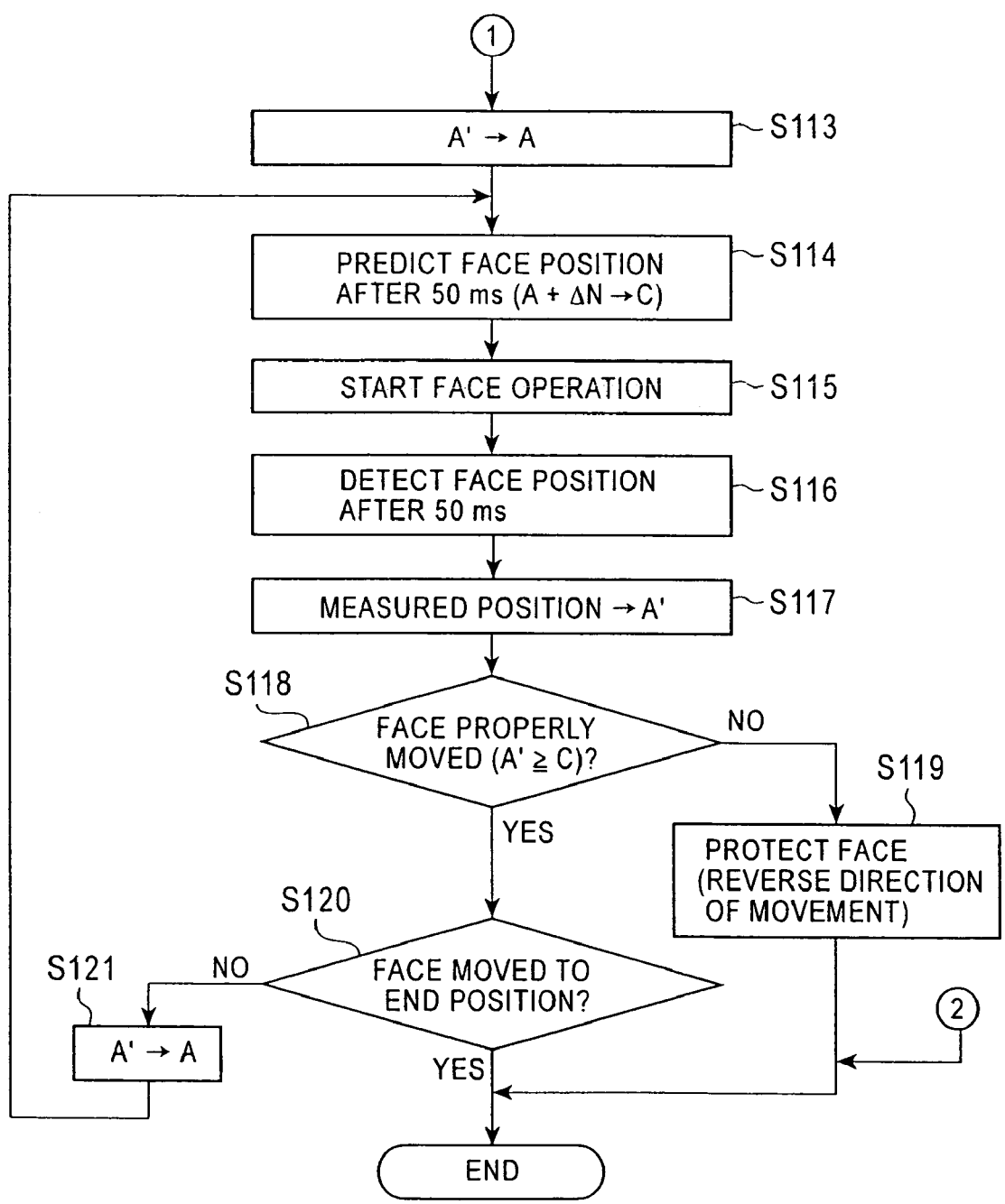
FIG. 9 is a flowchart showing an operation of the microcomputer according to the first embodiment.

Referring to FIG. 8, in step S101, when a trigger for starting operation of the movable face 25 is received from the operating unit 27, the microcomputer 171 sends a pull-up signal to the power circuit 102. Upon receiving the pull-up signal, the power circuit 102 supplies a voltage to the extension detecting switch 283, the retraction detecting switch 284, and the position detecting LPS 285. In step S102, upon receiving the voltage, the extension detecting switch 283 and the retraction detecting switch 284 detect the state of the movable face 25, and supplies the detected state to the microcomputer 171. For example, when the movable face 25 is in the retracted state, the extension detecting switch 283 outputs a Low-level detection signal d and the retraction detecting switch 284 outputs a High-level detection signal e. When the movable face 25 is in neither the extended state nor the retracted state, the extension detecting switch 283 and the retraction detecting switch 284 output Low-level detection signals d and e.

When the state of the movable face 25 is detected in the manner described above, in step S103, the microcomputer 171 determines a direction of movement of the movable face 25. For example, when the movable face 25 is in the retracted state, the microcomputer 171 determines that the movable face 25 is moved in the extending direction. On the other hand, when the movable face 25 is in the extended state, the microcomputer 171 determines that the movable face 25 is moved in the retracting direction. When the movable face 25 is in neither the extended state nor the retracted state, the microcomputer 171 determines that the movable face 25 is moved in one of the extending direction and the retracting direction.

Then, in step S104, the microcomputer 171 sets a position of starting operation of the movable face 25 as a position A. Furthermore, in step S105, the microcomputer 171 predictively calculates a position of the movable face 25 after a first predetermined time (e.g., 100 ms) (hereinafter referred to as a predicted position B), i.e., A+ΔM=B. The first predetermined time refers to a hazard detecting time for detecting occurrence of a hazard. ΔM denotes a predetermined distance that the movable face 25 is predicted to move in the first predetermined time in a high-speed operation.

Then, in step S106, the microcomputer 171 generates driving signals a, b, and c, and supplies the driving signals a, b, and c to the motor driver 282 to start operation of the movable face 25. Table 1 below shows combinations of the driving signals a, b, and c and motor controlling operations.

TABLE 1

| Driving Signal A | Driving Signal B | Driving Signal C | Operation of movable face |
|---|---|---|---|
| Low | Low | Low | Stopped (indeterminate output) |
| High | Low | Low | Extending direction (high speed) |
| Low | High | Low | Retracting direction (high speed) |
| High | Low | High | Extending direction (low speed) |
| Low | High | High | Retracting direction (low speed) |
| High | High | High/Low | Brake |

As shown in Table 1, when the driving signals a, b, and c are at Low level, the motor driver 282 stops the movable face 25. When the driving signal a is at High level, the driving signal b is at Low level, and the driving signal c is at Low level, the motor driver 282 supplies a current to the motor 281 so that the movable face 25 will be moved in the extending direction by a high-speed operation. When the driving signal a is at Low level, the driving signal b is at High level, and the driving signal c is at Low level, the motor driver 282 supplies a current to the motor 281 so that the movable face 25 will be moved in the retracting direction by a high-speed operation. When the driving signal a is at High level, the driving signal b is at Low level, and the driving signal c is at High level, the motor driver 282 supplies a current to the motor 281 so that the movable face 25 will be moved in the extending direction by a low-speed operation. When the driving signal a is at Low level, the driving signal b is at High level, and the driving signal c is at High level, the motor driver 282 supplies a current to the motor 281 so that the movable face 25 will be moved in the retracting direction by a low-speed operation. When the driving signals a and b are at High level and the driving signal c is at High level or Low level, the motor driver 282 supplies a current to the motor 281 so that movement of the movable face 25 will be stopped. Thus, in step S106, the microcomputer 171 pulls the driving signal c to Low, and one of the driving signals a and b to High and the other to Low.

When the first predetermined time (100 ms in this embodiment) elapses after the face operation is started, in step S107, the microcomputer 171 detects a current position of the movable face 25. The current position is detected based on an analog signal received from the position detecting LPS 285. The analog signal received from the position detecting LPS 285 is supplied to an A/D conversion port of the microcomputer 171, and is converted into digital data that can be processed in the microcomputer 171. An internal cache of the microcomputer 171 stores a table associating the digital data with a position of the movable face 25. The microcomputer 171 refers to the table based on the value obtained by A/D conversion, thereby determining the current position of the movable face 25.

Then, in step S1108, the microcomputer 171 sets the detected current position as A'. In step S109, the microcomputer 171 compares the current position A' with the predicted position B to determine whether A'≧B, i.e., whether the movable face 25 has been properly moved.

If step S109 results in "No", i.e., if it is determined in step S109 that the movable face 25 has not been properly moved, the microcomputer 171 carries out face protection in step S110, and then exits the procedure. The face protection refers to an operation of reversing the direction of movement of the movable face 25, an operation of ending movement of the movable face 25, or the like.

On the other hand, if step S109 results in "Yes", i.e., if it is determined in step S109 that the movable face 25 has been properly moved, in step S111, the microcomputer 171 determines whether the current position A' of the movable face 25 has reached a predetermined target position of movement by comparing the current position A' with the predetermined position.

If step S111 results in "No", i.e., if it is determined in step S111 that the movable face 25 has not reached the predetermined position, in step S112, the microcomputer 171 sets the current position A' as the position A, and then returns to step S105. On the other hand, if step S111 results in "Yes", i.e., if it is determined in step S111 that the movable face 25 has reached the predetermined position, the microcomputer 171 proceeds to step S113 shown in FIG. 9. In this description, processing in the initial stage described above will be referred to as a phase α, and subsequent processing will be referred to as a phase β.

In step S113, the microcomputer 171 sets the current position A' as the position A. Furthermore, the microcomputer 171 predictively calculates the position of the movable face 25 after a second predetermined time (e.g., 50 ms) (hereinafter referred to as a predicted position C), i.e., A+ΔN=C. The second predetermined time refers to a hazard detecting time for detecting occurrence of a hazard. The second predetermined time is chosen to be shorter than the first predetermined time. This allows occurrence of a hazard to be detected more quickly. ΔN denotes a predetermined distance that the movable face 25 is predicted to move in the second predetermined time by a low-speed operation.

Then, in step S115, the microcomputer 171 generates the driving signals a, b, and c, and supplies the driving signals a, b, and c to the motor driver 282 to start operation of the movable face 25. In step S115, the microcomputer 171 pulls the driving signal c to High, and one of the driving signals a and b to High and the other to Low.

When the second predetermined time (50 ms in this embodiment) has elapsed after the face operation is started, in step S116, the microcomputer 171 detects a current position of the movable face 25. The detecting method used is the same as that in step S107 described earlier, so that a description thereof will be omitted.

Then, in step S117, the microcomputer 171 sets the detected current position as A'. In step S118, the microcomputer 171 compares the current position A' with the predicted position C to determine whether A'≧C, i.e., whether the movable face 25 has been properly moved. If step S118 results in "No", i.e., if it is determined in step S118 that the movable face 25 has not been properly moved, the microcomputer 171 carries out face protection in step S119, and then exits the procedure. The face protection is the same as that in step S110.

If step S118 results in "Yes", i.e., if it is determined in step S1118 that the movable face 25 has been properly moved, in step S120, the microcomputer 171 determines whether the current position A' of the movable face 25 is an end position. This may be determined by comparing the current position A' with the end position, i.e., the position in the extended state or the position in the retracted state, or based on the detection signal d or e received from the extension detecting switch 283 or the retraction detecting switch 284.

If step S120 results in "No", i.e., if it is determined in step S120 that the movable face 25 has not reached the end position, in step S121, the microcomputer 171 sets the current position A' as the position A, and then returns to step S114. On the other hand, if step S120 results in "Yes", i.e., if it is determined in step S120 that the movable face 25 has reached the end position), the microcomputer 171 exits the procedure.

As described above, different moving speeds and different hazard detecting times are used in the phases α and β. Thus, quick and smooth movement is achieved in the phase α, and safe operation is achieved in the phase β. That is, control is exercised suitably in accordance with the probability of occurrence of a hazard.

Second Embodiment

Next, a second embodiment of the present invention will be described with reference to the drawings. In the following description, parts corresponding to those in the first embodiment are designated by the same numerals, and detailed descriptions thereof will be omitted. Parts that are not specifically described are the same as those in the first embodiment.

Figure 10:
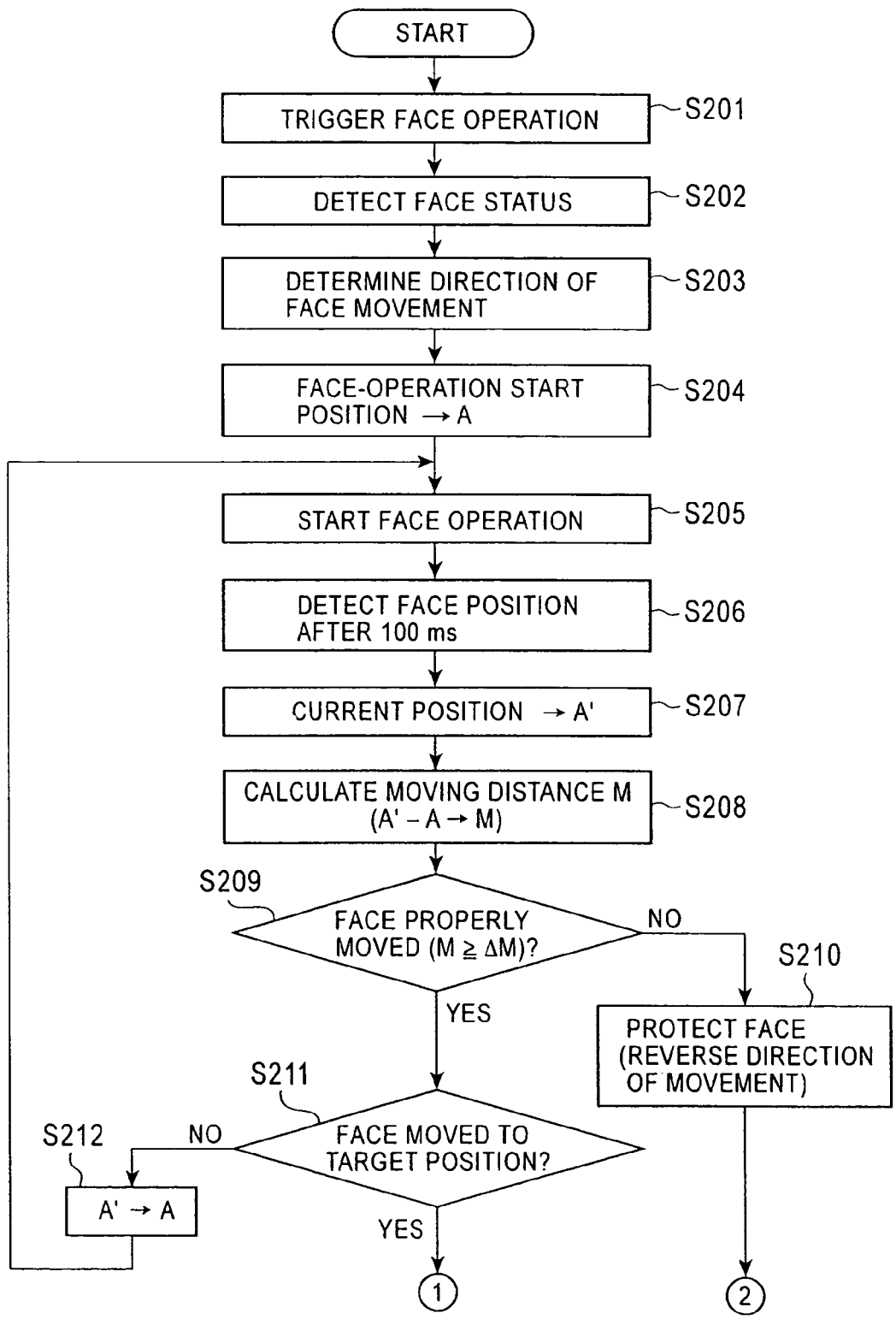
FIG. 10 is a flowchart showing an operation of a microcomputer according to a second embodiment of the present invention.
Figure 11:
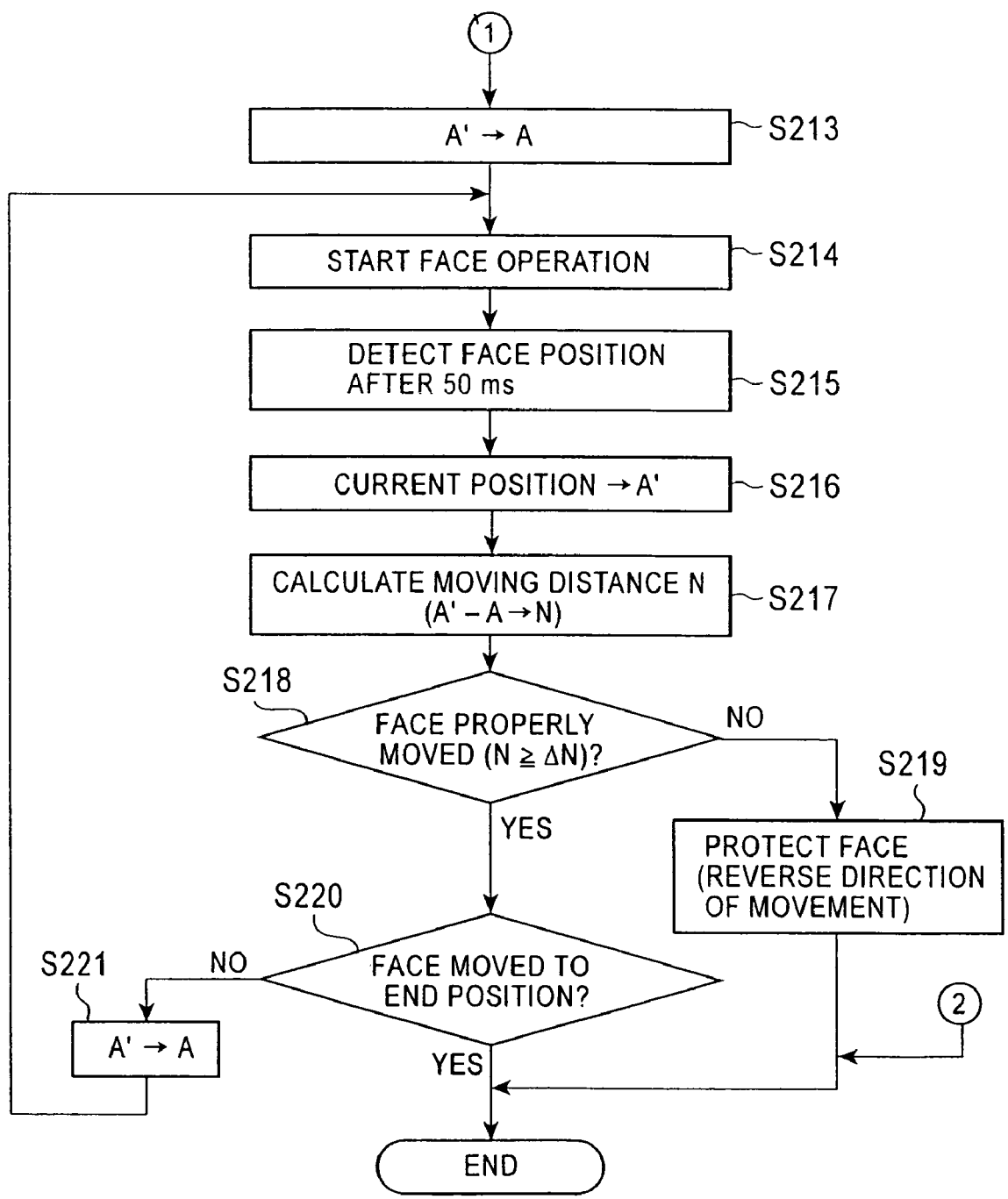
FIG. 11 is a flowchart showing an operation of a microcomputer according to the second embodiment.

In this embodiment, under the same construction as in the first embodiment, the microcomputer 171 operates according to flowcharts shown in FIGS. 10 and 11.

Referring to FIG. 10, in step S201, a trigger for starting the operation of the movable face 25 is received from the operating unit 27, and the microcomputer 171 sends a pull-up signal to the power circuit 102. Upon receiving the pull-up signal, the power circuit 102 supplies a voltage to the extension detecting switch 283, the retraction detecting switch 284, and the position detecting LPS 285. Upon receiving the voltage, in step S202, the extension detecting switch 283 and the retraction detecting switch 284 detect the state of the movable face 25, and supply the detected state to the microcomputer 171. For example, when the movable face 25 is in the retracted state, the extension detecting switch 283 outputs a Low-level detection signal d, and the retraction detecting switch 284 outputs a High-level detection signal e. On the other hand, when the movable face 25 is in the extended state, the extension detecting switch 283 outputs a High-level detection signal d, and the retraction detecting switch 284 outputs a Low-level detection signal e. When the movable face 25 is in neither the extended state nor the retracted state, the extension detecting switch 283 and the retraction detecting switch 284 output Low-level detection signals d and e.

When the state of the movable face 25 is detected in the manner described above, in step S203, the microcomputer 171 determines the direction of movement of the movable face 25. For example, when the movable face 25 is in the retracted state, the microcomputer 171 determines that the movable face 25 is moved in the extending direction. On the other hand, when the movable face 25 is in the extended state, the microcomputer 171 determines that the movable face 25 is moved in the retracting direction. When the movable face 25 is in neither the extended state nor the retracted state, the microcomputer 171 determines that the movable face 25 is moved in one of the extending direction and the retracting direction.

In step S204, the microcomputer 171 sets the start position of the movable face 25 as a position A. The operation described above is the same as the operation up to step S104 shown in FIG. 8.

Then, in step S205, the microcomputer 171 generates driving signals a, b, and c, and supplies the driving signals to the motor driver 282 to start operation of the movable face 25. The combinations of the driving signals a, b, and c are associated with motor controlling operations as shown in Table 1. Thus, the microcomputer 171 pulls the driving signal c to Low, and one of the driving signals a and b to High and the other to Low.

When a first predetermined time (100 ms in this embodiment) elapses after the face operation is started, in step S206, the microcomputer 171 detects a current position of the movable face 25. The detecting method used is the same as that in step S107, so that a description thereof will be omitted. The first predetermined time refers to a hazard detecting time for detecting occurrence of a hazard.

Then, in step S207, the microcomputer 171 sets the current position as A', and subtracts the position A from the current position A', thereby calculating a moving distance M of the movable face 25, i.e., A'−A→M. Then, in step S209, the microcomputer 171 compares the moving distance M with ΔM to determine whether M≧ΔM, i.e., whether the movable face 25 has been properly moved. ΔM denotes a predetermined distance that the movable face 25 is predicted to move in the first predetermined time in a high-speed operation.

If step S209 results in "No", i.e., if it is determined in step S209 that the movable face 25 has not been properly moved, the microcomputer 171 carries out face protection in step S210, and then exits the procedure. The face protection is the same as that in step S110.

On the other hand, if step S209 results in "Yes", i.e., if it is determined in step S209 that the movable face 25 has been properly moved, in step S211, the microcomputer 171 determines whether the current position A' of the movable face 25 has reached a predetermined target position of movement. This is determined by comparing the current position A' with the predetermined position.

If step S211 results in "No", i.e., if it is determined in step S211 that the movable face 25 has not reached the predetermined position, in step S212, the microcomputer 171 sets the current position A' as the position A, and then returns to step S205. On the other hand, if step S211 results in "Yes", i.e., if it is determined in step S211 that the movable face 25 has reached the predetermined position, the microcomputer 171 proceeds to step S213 shown in FIG. 11. In the following description, processing in the initial stage described above will be referred to as a phase α, and subsequent processing will be referred to as a phase β.

In step S213, the microcomputer 171 sets the current position A' as the position A. Then, in step S214, the microcomputer 171 generates driving signals a, b, and c, and supplies the driving signals a, b, and c to the motor driver 282 to start operation of the movable face 25. In step S214, the microcomputer 171 pulls the driving signal c to High, and one of the driving signals a and b to High and the other to Low.

When a second predetermined time (50 ms in this embodiment) elapses after the face operation is started, in step S215, the microcomputer 171 detects a current position of the movable face 25. The detection method used is the same as that in step S107 described earlier, so that a description thereof will be omitted. The second predetermined time refers to a hazard detecting time for detecting occurrence of a hazard. The second predetermined time is chosen to be shorter than the first predetermined time. This allows occurrence of a hazard to be detected more quickly.

Then, in step S216, the microcomputer 171 sets the current position as A'. In step S217, the microcomputer 171 subtracts the position A from the current position A', thereby calculating a moving distance N of the movable face 25, i.e., A'−A→N. Then, in step S218, the microcomputer 171 compares the moving distance N with ΔN to determine whether N≧ΔN, i.e., whether the movable face 25 has been properly moved. ΔN denotes a predetermined distance that the movable face 25 is predicted to move in the second predetermined time in a low-speed operation.

If step S218 results in "No", i.e., if it is determined in step S218 that the movable face 25 has not been properly moved, the microcomputer 171 carries out face protection in step S219, and exits the procedure. The face protection is the same as that in step S110.

If step S218 results in "Yes", i.e., if it is determined in step S218 that the movable face 25 has been properly moved, in step S220, the microcomputer 171 determines whether the current position A' of the movable face 25 is an end position. This can be determined by comparing the current position A' with the end position, i.e., the position in the extended state or the position in the retracted state, or based on the detection signal d or e supplied from the extension detecting switch 283 or the retraction detecting switch 284.

If step S220 results in "No", i.e., if it is determined in step S220 that the movable face 25 has not reached the end position, the microcomputer 171 sets the current position A' as the position A in step S221, and then returns to step S214. On the other hand, if step S220 results in "Yes", i.e., if it is determined in step S220 that the movable face 25 has reached the end position, the microcomputer 171 exits the procedure.

As described above, in the second embodiment, similar to the first embodiment, different moving speeds and different hazard detecting times are used in phases α and β. Thus, similar to the first embodiment, quick and smooth movement is achieved in phase α, and safe operation is achieved in phase β. That is, control is exercised suitably in accordance with the probability of occurrence of a hazard. Other parts of the second embodiment are the same as the corresponding parts in the first embodiment, so that descriptions thereof will be omitted.

Third Embodiment

Next, a third embodiment of the present invention will be described with reference to the drawings. In the following description, parts corresponding to those in the first embodiment are designated by the same numerals, and detailed descriptions thereof will be omitted. Parts that are not specifically mentioned are the same as those in the first embodiment.

Figure 12:
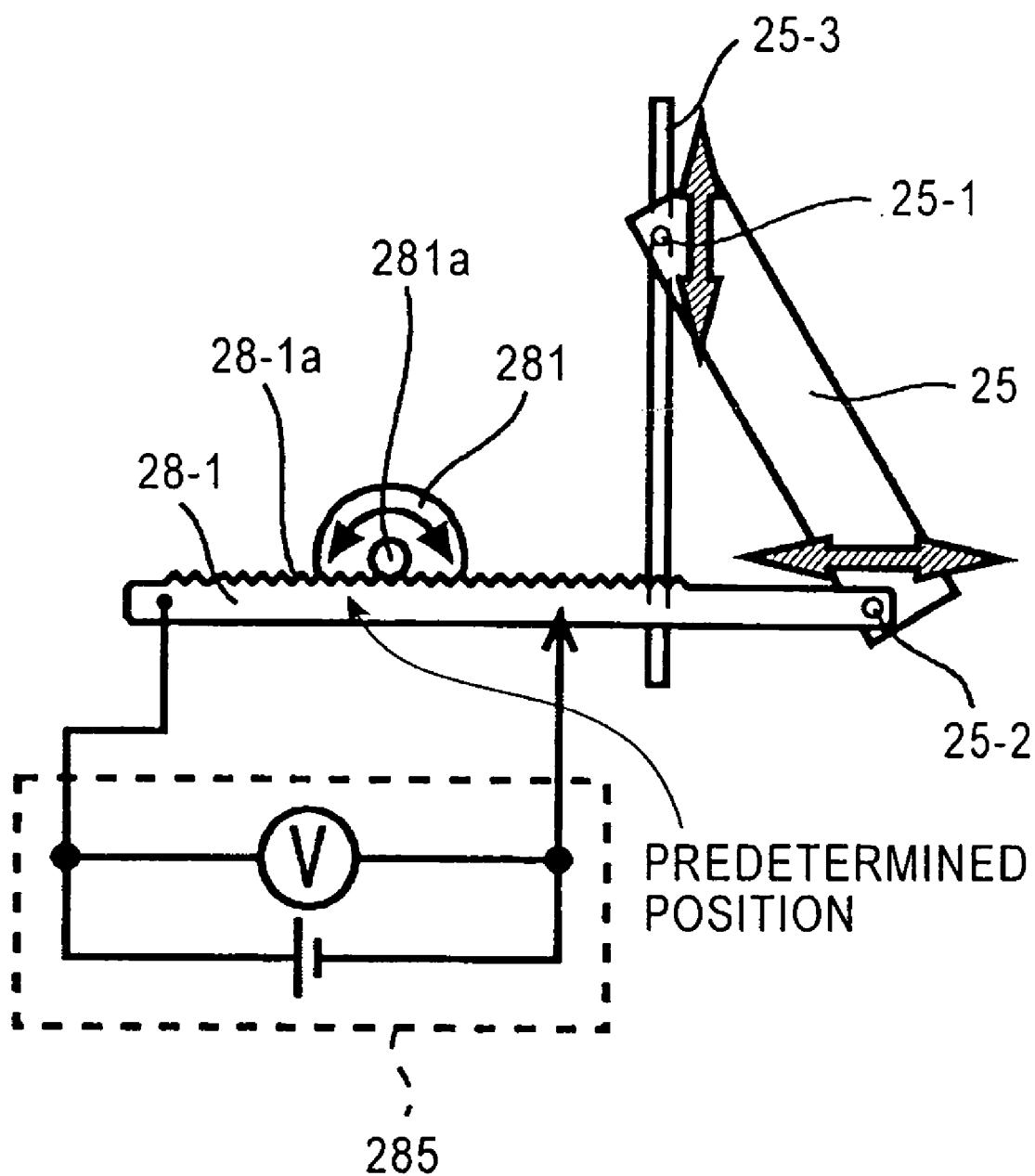
FIG. 12 is a diagram showing an example mechanism for driving and controlling a movable face in a navigation apparatus according to a third embodiment of the present invention.
Figure 13A:
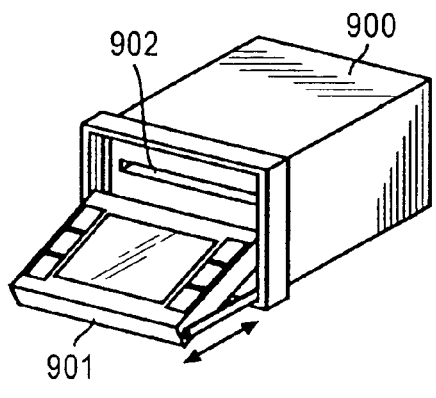
FIGS. 13A, 13B, and 13C are diagrams showing schematic constructions of movable faces according to the related art.
Figure 13B:
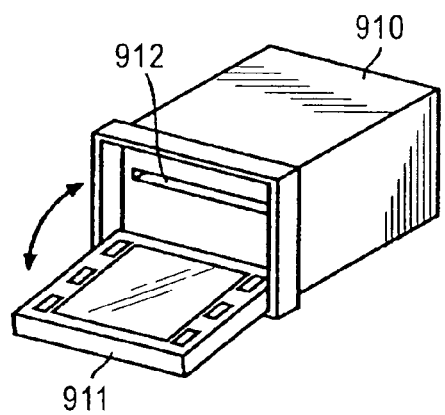
Figure 13C:
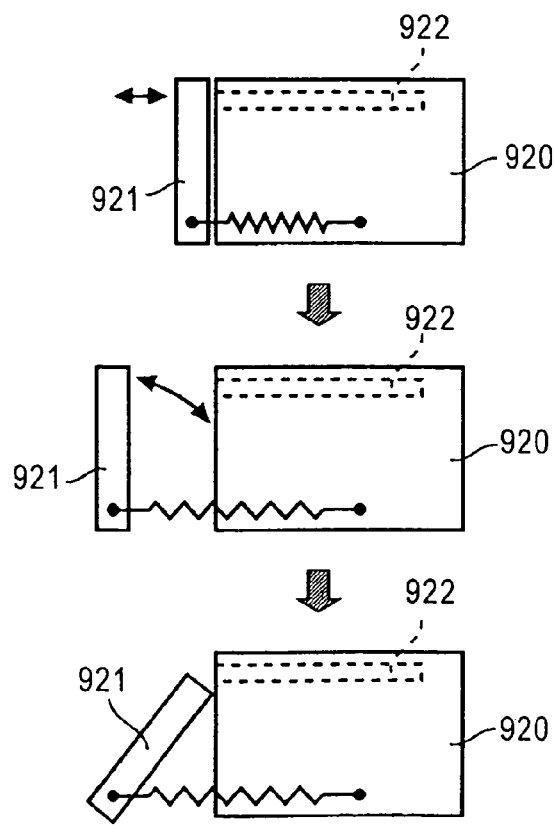

The third embodiment differs from the first embodiment with respect to the arrangement for detecting a current position of the movable face 25, which is shown in FIG. 12.

As shown in FIG. 12, the arrangement for moving the movable face 25 in the extending direction or retracting direction is basically the same as that in the first embodiment. In this embodiment, each of the arms 28-1 functions as a variable resistor. More specifically, a control terminal fixed on the main unit 1 is slidably brought into contact with the arm 28-1, and a voltage is applied between the control terminal and one end of the arm 28-1. Thus, a voltage based on the position of the control terminal on the arm 28-1 is obtained. The voltage is detected by the position detecting LPS 285, similar to the first embodiment. The other parts and operation, including the operation of the microcomputer 171 based on the voltage detected (analog signal), are the same as those in the first embodiment, so that descriptions thereof will be omitted.

The first to the third embodiments described above are only examples for embodying the present invention, and the present invention is not limited to these embodiments. Various modifications of the embodiments are within the scope of the present invention, and it is obvious from the above description that various other embodiments are possible within the scope of the present invention. For example, although the movable face 25 is driven and controlled using two moving speeds and two hazard detecting times in the embodiments, the present invention is not limited thereto, and the movable face 25 may be driven and controlled using three or more moving speeds and hazard detecting times. In that case, preferably, the moving speed in the proximity of an initial position is chosen to be faster than that in the proximity of an end point, and the hazard detecting time in the proximity of an initial point is chosen to be longer than that in the proximity of an end point. Accordingly, the movable face 25 is moved quickly and smoothly in a section where the probability of occurrence of a hazard is relatively low, and the movable face 25 is moved safely in a section where the probability of occurrence of a hazard is relatively high.

Furthermore, although the embodiments have been described above in the context of the navigation apparatus 10 as an example, the present invention is not limited thereto, and can be applied to any electronic apparatus having a movable member.

What is claimed is:

1. An electronic apparatus comprising:
   a movable member that is allowed to move in a plurality of sections;
   a driving unit for moving the movable member; and
   a controller for controlling the driving unit and for detecting a hazard that occurs during movement of the movable member at respectively different sensitivities in the plurality of sections;
   wherein the sensitivities correspond to periods for detecting the occurrence of a hazard, and a period for a section having a higher probability of occurrence of the hazard is shorter than a period for a section having a lower probability of occurrence of the hazard.

2. The electronic apparatus according to claim 1, wherein the sensitivities correspond to periods for detecting an amount of movement of the movable member, and the controller detects occurrence of the hazard based on whether an amount of movement of the movable member in one period has reached a target amount of movement.

3. The electronic apparatus according to claim 1, wherein the sensitivities correspond to periods for detecting an amount of movement of the movable member.

4. The electronic apparatus according to claim 1, wherein the sensitivities correspond to periods for detecting a position of the movable member, and the controller detects occurrence of the hazard based on whether the movable member has reached a target position in one period.

5. The electronic apparatus according to claim 1, wherein the sensitivities correspond to periods for detecting a position of the movable member.

6. The electronic apparatus according to claim 1, wherein the controller moves the movable member at speeds based on the plurality of sections.

7. The electronic apparatus according to claim 1, wherein the sensitivities correspond to periods for detecting an amount of movement of the movable member, a period for a first section having a higher probability of occurrence of the hazard is shorter than a period for a second section having a lower probability of occurrence of the hazard, and the controller moves the movable member at a lower speed in the first section than in the second section.

8. The electronic apparatus according to claim 1, wherein the sensitivities correspond to periods for detecting a position of the movable member, a period for a first section having a higher probability of occurrence of the hazard is shorter than a period for a second section having lower probability of occurrence of the hazard, and the controller moves the movable member at a lower speed in the first section than in the second section.

9. The electronic apparatus according to claim 1, wherein the controller moves the movable member reciprocally in a first direction and a second direction, and the plurality of sections is set individually for each of the first direction and the second direction.

10. The electronic apparatus according to claim 1, wherein the controller moves the movable member reciprocally in a first direction and a second direction, and the plurality of sections include a section where a sensitivity for the first direction differs from a sensitivity for the second direction.

11. The electronic apparatus according to claim 1, wherein the controller sets a higher sensitivity for a section that is immediately before an end point of movement than for a section that is immediately after a start point of movement.

12. The electronic apparatus according to claim 1, wherein the controller reverses a direction of movement of the movable member when occurrence of the hazard is detected.

13. The electronic apparatus according to claim 1, wherein the movable member comprises a face for moving a display panel to an open or closed position.

14. A method of detecting a hazard for movement, the method comprising:

moving a movable member in a plurality of sections; and detecting a hazard that occurs during movement of the movable member;

wherein the detecting act detects occurrence of the hazard at respectively different sensitivities in the plurality of sections, the sensitivities corresponding to periods for detecting the occurrence of a hazard, and a period for a section having a higher probability of occurrence of the hazard being shorter than a period for a section having a lower probability of occurrence of the hazard.

15. The method of detecting a hazard for movement according to claim 14, wherein the sensitivities correspond to periods for detecting an amount of movement of the movable member, and the detecting act detects occurrence of the hazard based on whether an amount of movement of the movable member in one period has reached a target amount of movement.

16. The method of detecting a hazard for movement according to claim 14, wherein the sensitivities correspond to periods for detecting a position of the movable member, and the detecting act detects occurrence of the hazard based on whether the movable member has reached a target position in one period.

17. The method of detecting a hazard for movement according to claim 14, wherein the moving act moves the movable member at speeds based on the plurality of sections.

18. A method of detecting a hazard for movement according to claim 14, further comprising reversing a direction of movement of the movable member when occurrence of the hazard is detected in the detecting act.

* * * * *